United States Patent Office 3,496,529
Patented Feb. 17, 1970

3,496,529
METHODS AND APPARATUS FOR IDENTIFYING OR ATTENUATING UNDESIRED MULTIPLE REFLECTIONS IN A SEISMIC WAVE RECORD
Nigel Allister Anstey, Orpington, and Paul Newman, Keston, England, assignors to Seismograph Service Corporation, Tulsa, Okla.
Filed June 14, 1967, Ser. No. 646,029
Claims priority, application Great Britain, June 15, 1966, 26,644/66
Int. Cl. G01v 1/00; G06f 15/34; G06g 7/19
U.S. Cl. 340—15.5                    12 Claims

ABSTRACT OF THE DISCLOSURE

This invention relates to methods of and also to apparatus for use in the interpretation of seismic or other signals which include primary and secondary reflections. The received signals or signals obtained from them are retro-correlated to produce synthetic multiple reflection signals; these may be used for direct comparison with the received signals or they may be added to the latter in antiphase to reduce the secondary reflections relatively to the primary reflections.

The apparatus used includes a retro-correlation unit which can be connected in a number of ways to the inputs and outputs for signals being analysed.

---

The invention forming the subject of the present application is concerned with the identification and/or the attenuation of multiple reflections in echo-ranging techniques. It has for its principal object the provision of novel and improved methods of and apparatus for doing this.

The methods and apparatus of the invention are applicable to and can be used in, inter alia deep echo sounding, ultrasonic flaw detection and ionospheric sounding. The invention will, however, here be described with particular reference to the seismic reflection method of exploring the earth's crust.

It is common practice in exploration seismology to initiate a seismic source (explosion, impact or equivalent) every few hundred metres along a line of profile, with seismic detector groups spaced every few tens of metres each side of the source, also along the line. By this means a waveform representing a sample of the earth's reflections is obtained every few tens of metres. These waveforms are then arranged in a side-by-side display called a record section—which may be viewed as a cross-section through the reflecting strata of the earth.

The interpretation of a seismic record section is often complicated by the presence of multiple reflections. These occur between every pair of reflectors, and are infinite in number. However, the most significant reflector in generating multiple reflection systems is the surface itself (at least in the early parts of the seismic record). Therefore we propose to identify multiple reflections by synthesizing the multiples engendered between the surface and the reflectors recorded in the field, and by comparison, particularly visual comparison, of these synthesized multiples with the original record section. Where conditions are such that the synthesis of the multiples can be very accurate, we further propose the use of these synthesised multiples in the attenuation of the observed multiples.

It is, accordingly, an object of the present invention to provide methods of and apparatus for synthesizing multiple reflections utilising a process of retro-correlation.

It is a further object of the invention to provide for the use of the synthesized multiple reflections in a manner which assists in facile comparison of the synthesized multiples with suspected multiples on the original record section or on one obtained from the latter.

Yet another object is to provide a method of and means for using the synthesized multiples for the supression or attenuation of the observed multiples on the original record section or one obtained from it.

The technique for synthesizing multiple reflections, which forms an important part of this invention, is based on retro-correlation, which we define as the operation of correlating a time waveform against itself (or a portion of itself) reversed in time. In this sense the process may also be termed auto-convolution. In a wider sense, which comes within this invention, we include also the type of operation where one time waveform is correlated against a second waveform derived from or related to the first, and where one of the two waveforms is reversed in time.

Multiple reflections may be synthesized by retro-correlation of a seismic reflection trace with itself, or with an adjacent trace. Another method is by retro-correlation of a seismic reflection trace with its own one-sided auto-correlation function from which the portion near to the origin has been removed.

We shall illustrate the process here by a discussion of the results obtained by retro-correlation of a trace with itself or an adjacent trace, though many of these disclosures apply also to the use of the auto-correlation function as one component in the retro-correlation operation.

For the better understanding of the invention reference should be made to the accompanying drawings, in which.

Figure 1:
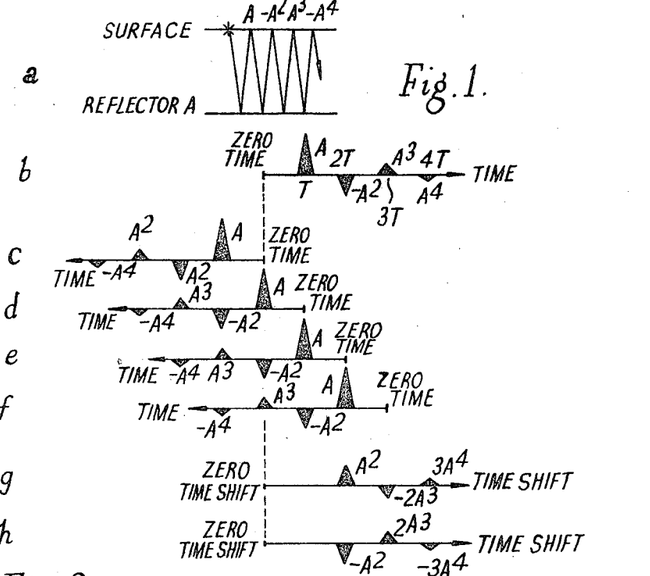
FIGURE 1 illustrates an idealized seismic situation, $a$ showing a signal being reflected and transmitted between the surface and a single reflector, $b$ showing the corresponding seismic reflection trace, $c$ showing the same trace reversed in time, $d$, $e$ and $f$ showing the trace line of $1c$ shifted to the right, $g$ showing the result of a correlation between the moving trace and the original trace $b$, and $h$ showing the trace $g$ reversed in polarity, that is inverted.

FIGURE $1a$ depicts a completely idealized seismic situation, which includes the surface (of reflection coefficient $-1$) and a single reflector (of reflection coefficient A). Then the line $b$ illustrates the corresponding seismic reflection trace, for conditions of simple spike pulses, unit input amplitude, spherical spreading correction, and no noise. The primary reflection appears at time T and it has an amplitude A; the first multiple has time 2T and amplitude $-A^2$, the second multiple has time 3T and amplitude $A^3$, and so on.

In the line $c$ we show the same trace reversed in time, and arranged so that its zero coincides with that of the original trace. This is the initial condition, i.e. the time zero of the retro-correlation process. Then the process consists in shifting the trace of line $c$ bodily to the right, as suggested by the lines $d$, $e$ and $f$. This trace shift may be effected by holding stationary the original trace represented by line $b$ and correlating this stationary trace against a moving trace which, during movement, successively occupies the positions represented by $c$, $d$, $e$ and $f$. The result—the retro-correlogram—is shown in line $g$.

This result is obtained as follows. The situation of line $c$, where the shift is zero, produces no correlation output. Neither does that of line $d$; no pulses coincide, so there is no correlation. When the shift becomes 2T, however, as shown in line $e$, the primary reflection on the stationary trace correlates with the primary reflection on the moving trace, to produce a correlation output which is a spike pulse of amplitude $A^2$. When the shift becomes 3T (as shown in line $f$), the correlation process produces a spike pulse of amplitude $-2A^3$, and when it becomes 4T$a$ spikes pulse of amplitude $3A^4$.

Now we may change the polarity of line $g$ (the output of the retro-correlation process) to obtain the final output shown in line $h$, and we may compare this with the original signal in line $b$.

First, we note that the inverted retro-correlation function (line $h$) does not include the primary reflection—it contains only the multiples.

Second, we note that the inverted retro-correlation function synthesizes the first-order multiples precisely, in time (2T), in sign (negative) and in amplitude ($A^2$).

Third, we note that the inverted retro-correlation function synthesizes the higher-order mutiples with the correct time and the correct sign, but with amplitudes which are progressively more and more exaggerated ($2A^3$ instead of $A^3$, $3A^4$ instead of $A^4$, and so on).

Figure 2:
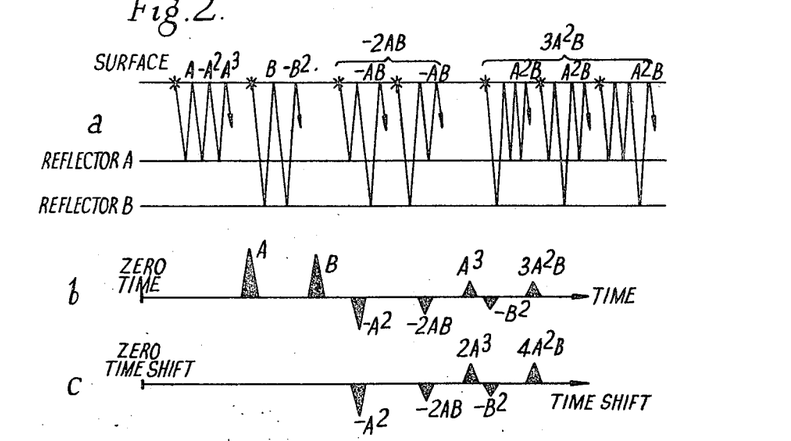
FIGURE 2 illustrates at $a$ a similar situation but with two reflectors, $b$ showing the initial part of the reflection trace and $c$ showing the inverted output of the retro-correlation process.

Now we may introduce a second reflector, as shown at the top of FIGURE 2. The initial part of the resulting reflection trace is shown in line $b$. The inverted output of the retro-correlation process is shown in line $c$. Again we see that the inverted retro-correlation function does not include either of the two primaries, that all first-order surface multiples are correctly synthesized, and that higher-order surface multiples are synthesized with progressively exaggerated amplitudes.

In fact this is a general conclusion, of which the situations of FIGURE 1 and FIGURE 2 are simple illustrations. The general properties of the output of the retro-correlation process may be summarised thus:

The inverted retro-correlation function of a seismic trace cannot, in its nature, include any primary reflection. It synthesizes all surface multiple reflections at the correct time and with correct polarity. First-order surface multiples are generated with correct amplitudes, higher-order surface multiples with progressively exaggerated amplitudes.

As noted earlier, the usual presentation of seismic reflection results is a record section, which is a side-by-side display of many individual reflection traces. Then the first step in the use of the present invention is the retro-correlation of each of these many reflection traces (each trace yielding a corresponding retro-correlation function) and the side-by-side display of these retro-correlation functions in a manner similar to that of the record section.

The result is a sectional retro-correlogram, which may be considered as a record section which contains no primaries. It contains all surface multiples, but it does not guarantee a correct balance of amplitudes between low-order and high-order multiples.

Figure 3:
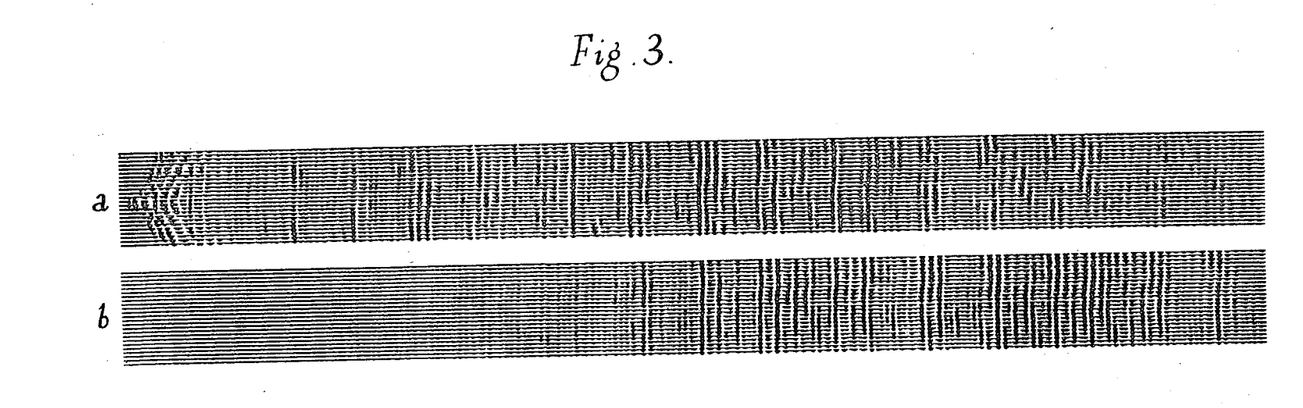
FIGURE 3 shows at $a$ a single seismic record, shot on land and at $b$ a retro-correlogram produced from the record $a$.

FIGURE 3 illustrates the operation. In it FIGURE 3a is a single record, shot on land in an area known to be rich in multiple reflections, whilst FIGURE 3b is the corresponding retro-correlogram.

From about 1 second onwards, virtually every event on the field record has a counterpart on the retro-correlogram. The field record, of course, must represent primaries plus multiples, whereas the retro-correlogram can contain only the multiples. It follows that the geophysical interpreter must discount any event on the original record which is also clearly evident on the retro-correlogram—in this illustration almost the whole record after 1 second. The value of the present invention is well illustrated by this, for the interpreter could not decide which were primary reflections and which were multiple reflections from FIGURE 3a alone.

The discussion of FIGURES 1 and 2 was confined to simple spike pulses, whereas it is well known that in practice the seismic pulse is subject to several agencies which shape and broaden its form as it progresses through the earth. An analysis of these agencies, and of their effects on the retro-correlation process, shows that the pulse shape of a multiple synthesized by retro-correlation is not exact; the retro-correlation process contributes a double portion of the pulse-shaping action which occurs close to the seismic source. However, we have found that this effect is small, and that it can be compensated very easily by the combination of a small shift in the time origin of the original record and by a simple high-frequency boost. For example, the illustration of FIGURE 3b was made with a simple high-frequency boost of $+6$ db/octave.

Figure 4:
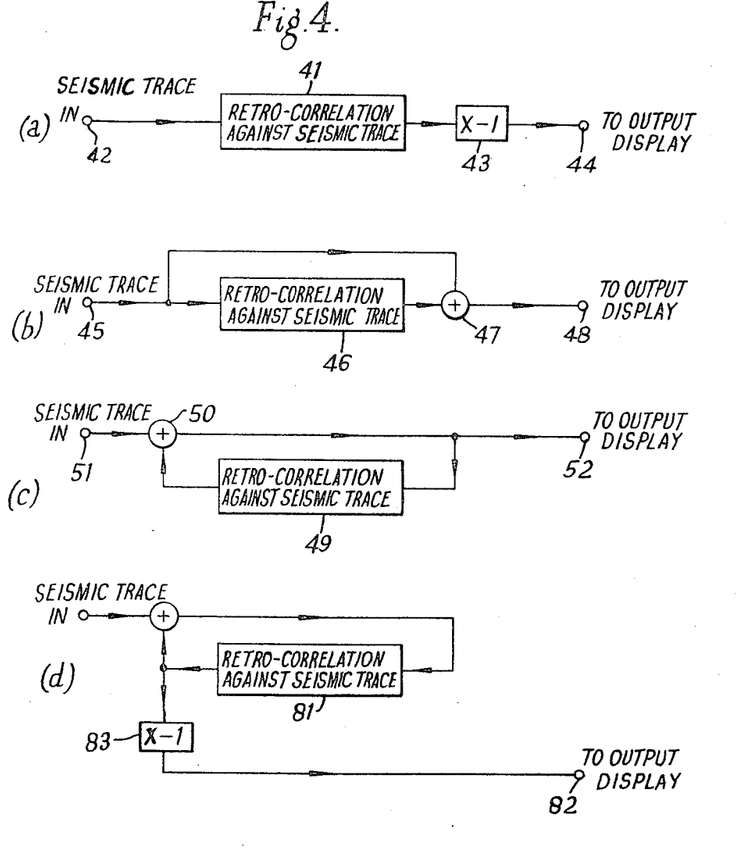
FIGURE 4 shows, in block diagram form, four ways in which the retro-correlation process may be used in the identification of multiple reflections (FIGURES $4a$ and $4d$) and in the suppression of multiple reflections (FIGURES $4b$ and $4c$).
Figure 7:
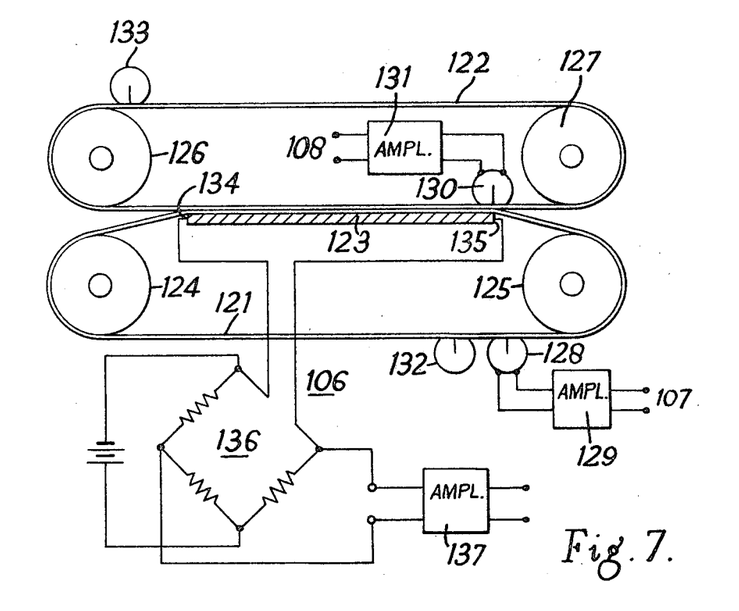
FIGURE 7 shows diagrammatically one form of correlator which may be used in carying out the invention.

In block-diagram form, the general arrangement described above can be as shown in FIGURE 4a. Here the reference 41 indicates retro-correlation apparatus which embraces the operation of correlating the input signal received from 42 with a previously-inserted version of the seismic reflection trace (or a part thereof) reversed in time. The retro-correlation effected by the apparatus 41 may be achieved by a two tape magnetic correlator as illustrated in FIG. 7 and described hereinafter. One tape has recorded thereon the seismic reflection trace signal from the input 42 while the other tape has recorded thereon the time reversed version of this seismic reflection trace. The reference 43 indicates the polarity inversion (and the means producing it) which are implicit in the transition from FIGURE 1g to FIGURE 1h. The circuit 42 comprises a conventional inverter circuit. The output display apparatus, which is connected to or indicated by the reference 44, is conventional and is preferably of a type which is identical to that used in the preparation of the original record section.

To the extent that the synthesized multiples in the retro-correlogram accurately represent the multiples actually observed in the seismic trace, the latter multiples can be removed by subtraction of the retro-correlogram from the trace. Since we have throughout considered the inverted retro-correlation function—as in FIGURE 1h—this is the same as the addition of the direct output of the retro-correlation process (without inversion) to the trace. This method and apparatus are illustrated in FIGURE 4b, in which the input is shown at 45, the retro-correlator at 46, the summation point at 47 and the output at 48. The retro-correlator 46 may be of the same type as the retro-correlator 41 referred to above. Although this is not at present a preferred technique, it is nevertheless within the substance of the present invention.

The reason why the arrangement of FIGURE 4b cannot be expected to produce perfect suppression of multiples is concerned with the exaggeration of the higher-order multiples synthesized by the retro-correlation process. Thus, if the sequence of reflection coefficients in the earth is such that higher-order multiples are insignificant, even with the exaggeration afforded by retro-correlation, then the approach of FIGURE 4b may be satisfactory. Otherwise it may be safer not to attempt to cancel the multiples with the arrangement of FIGURE 4b, but to rely on the identification of the multiples afforded by the sectional retro-correlogram, i.e. the output from the arrangement of FIGURE 4a. The measure of this is evident in FIGURE 3. The retro-correlogram itself clearly shows which events are to be discarded as multiples, and while the use of the retro-correlogram to cancel the multiples in the record itself would be reasonably satisfactory in the middle part of the record, the exaggeration of amplitudes towards the end of the retro-correlogram might invalidate or at least reduce the value of this approach in that region.

Another arrangement of importance is that illustrated in FIGURE 4c. In this arrangement the output from the process is retro-correlated in a retro-correlator 49 against the previously-inserted seismic trace, and the results of the retro-correlation step are fed back to a summing point 50 for addition to the input from 51. The resulting output is received at 52. Here again, the retro-correlator 49 may be of the same type as the retro-correlator 41 described above.

We have found that, in principle, this arrangement is capable of suppressing all surface multiple reflections. Again this is a general result, which is applicable to even the most complex surface multiple paths, but we shall be content here to illustrate the action on the simple multiple-generating model of FIGURE 1a.

Figure 5:
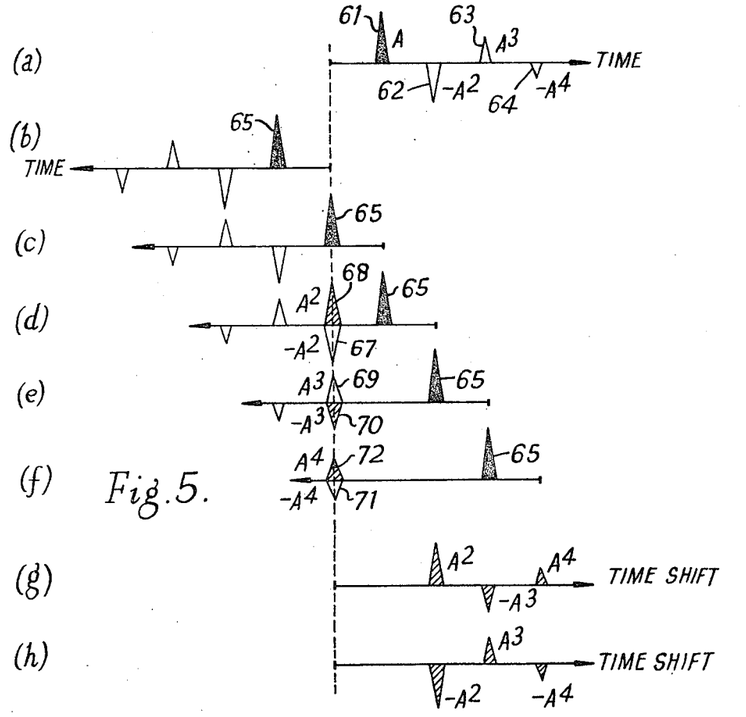
FIGURE 5 extends the demonstration of retro-correlation in FIGURE 1 to show the effect of including the retro-correlation process in a feed-back loop.

In FIGURE 5a we repeat FIGURE 1b, illustrating the basic seismic reflection trace which is obtained from this simple model. The solid spike 61 represents the primary reflection and the open spikes 62–64 represent the first three orders of multiple reflection. Then we visualize FIGURE 5a as the seismic trace already inserted into the retro-correlation unit 49 of FIGURE 4c. We then apply the seismic trace to the input 51 of FIGURE 4c in the reversed time sense; FIGURE 5b illustrates the situation as this trace is just about to be injected into the system. Just as in FIGURES 1c and 1d, it passes through the condition of FIGURES 5b and 5c without producing any output from the retro-correlation process back to the summing point; the primary reflection 65 therefore proceeds through to the output display unaffected by the presence of the retro-correlation loop.

At the time represented by FIGURE 5d, however, a new circumstance arises. The first-order multiple reflection 67 is injected into the input terminal at the same time as the primary reflection 65 in FIGURE 5d correlates with the primary reflection 61 in FIGURE 5a. The latter process produces a synthesized multiple 68 of amplitude $A^2$, which is fed back to the summing point; there it meets and cancels the $-A^2$ multiple 67 in the input seismic trace. In FIGURE 5d the first-order multiple represented by the open spike 67 is cancelled by the synthesized first-order multiple represented by the hatched spike 68. Consequently there is no output to the display at this time; the multiple reflection is suppressed.

FIGURE 5e represents the situation as the next multiple reflection arrives at the input; the second-order multiple 69 is exactly cancelled by the synthesized multiple 70 arising from the correlation of the primary 65 in FIGURE 5e with the first-order multiple 62 in FIGURE 5a.

FIGURE 5f represents the situation as the next multiple reflection arrives at the input; the third-order multiple 71 is exactly cancelled by the synthesized multiple 72 arising from the correlation of the primary 65 in FIGURE 5f with the second-order multiple 63 in FIGURE 5a.

The process continues indefinitely in this manner, so that the only output from the summing point to the display is the primary reflection.

Extension of this simple treatment can be used to show that the method is also applicable to systems involving two reflectors and the surface, such as that of FIGURE 2. In fact, and as noted above, the method is quite general; it is equally effective for multiple-generating systems involving the surface and any number of reflectors. In the case of a single reflector, as we have shown, the first-order observed multiple is cancelled by a synthetic anti-multiple obtained from the retro-correlation of the primary with itself, while the $n$th-order observed multiple is cancelled by a synthetic anti-multiple obtained from the retro-correlation of the primary with the $(n-1)$th-order observed multiple. In the case of two reflectors, we have two single systems of this same type, plus a mixed system. In the mixed system, the first-order mixed multiple is cancelled by a synthetic anti-multiple obtained from the retro-correlation of the two primaries, while all the combinations of $n$th-order mixed multiples are cancelled by synthetic anti-multiples obtained from the retro-correlation of all the combinations of the two primaries with the $(n-1)$ the order observed multiples.

Clearly this method of practising the invention according to FIGURE 4c is very attractive, in that it allows the complete suppression of surface multiples. However, this is true only for the idealised seismic traces of the type illustrated in FIGURE 5; in practice, real seismic traces differ from these in several particulars, which will now be considered.

(1) The method described above relies on synthesized anti-multiples to cancel observed multiples. To do this the former should have exactly the same pulse form as the latter. As mentioned hereinbefore, the pulse form of the synthesized multiple can usually be approximated to that of the observed multiple by simple frequency-selective compensation; in the present context suitable pulse-shaping means (not shown) are inserted between the output of the retro-correlation apparatus 49 and the summing point 52 in FIGURE 4c. The estimation of the necessary pulse-shaping may be made empirically, or by the techniques of Wiener filtering, which are well known per se.

(2) Not only must the pulse forms of synthesized and observed multiples be the same, but the amplitudes must be the same also. This imposes several difficulties:

(i) The original seismic signal recorded in the field must be capable of reproduction with precisely reconstructed amplitudes. Modern recording equipments allow this.

(ii) The amplitude correction for spherical spreading of the seismic wavefront must be determined and applied accurately. This requires knowledge of the relation between average seismic velocity and reflection travel time in the earth, which is ordinarily available to sufficient accuracy. However, there is also a fundamental difficulty in that the spherical spreading correction for multiple reflections need not be the same as that for primaries (the distances travelled in the same time ordinarily being different), and so it is not possible to provide exact amplitude compensation for spherical spreading in the case of the multiples.

(iii) It is necessary to normalize the amplitudes of the signals used in the process so that they represent the amplitudes which would actually be obtained if the seismic source itself had an amplitude of unity. The necessary sealing factor is known if the reflection coefficient of any reflector (such as A in the foregoing material) is known; this can be derived from the auto-correlation function of the seismic reflection trace in a manner which is known per se. This method of deriving the scaling factor accommodates the fact that the reflection coefficient of the free surface of the earth does not always have the full value of $-1$, which has been assumed in the foregoing idealized treatment. It can also be shown to yield optimum compensation for the transmission losses incurred at interfaces in the earth.

(3) Not only must the pulse forms and amplitudes of the synthesized and observed multiples be the same, but the times must be the same also. This is tantamount to ensuring that the effective positions of the seismic source and the seismic detectors lie in the surface. For seismic work on land, where the detectors are normally at the surface, this merely requires a shift in the effective origin of the seismic reflection trace to compensate for the instrumental lag, for the depth of the source below the surface, and for the effective time delay in the generation of a stable seismic pulse; these corrections are well known in the art. For seismic work at sea, where the detectors are normally some distance below the surface, it is also necessary to apply an appropriate time shift and an appropriate inverse operator to remove the frequency-selective effect of the free-surface reflection; these processes are also well known in the art.

(4) The idealised treatment of FIGURE 5 assumes that the detector is very close to the source (so that the effect known in the art as "normal moveout" is small) and that all reflectors are parallel to the surface. It also assumes that no ambient noise is recorded by the detectors.

These, then are the requirements that the operation represented by FIGURE 4c should be fully successful. In practice it is found that in many areas they can be satisfied to a degree which allows useful suppression of the surface multiples, provided that proper care is taken with the original field work and with the minimisation of the above-listed departures from the ideal.

We have found, however, that in other areas the requirements for satisfactory operation of the arrangement of FIGURE 4c are sufficiently onerous to be uneconomic. In these cases we fall back on the view that multiple reflection problems do not always require the suppression of the multiples; it is often sufficient that the multiples be identified. This is the function of the retro-correlogram display which has been described with particular reference to FIGURE 4a. However, the feedback arrangement of FIGURE 4c shows how the simple retro-correlogram of FIGURE 4a can be improved. The manner of making this improved retro-correlogram is represented by FIGURE 4d.

In FIGURE 4d the arrangement is basically as in FIGURE 4c, with the retro-correlation unit 81 included in a feedback loop, but the output to the final display 82 is taken from the output of the retro-correlation unit 81. The signal present at this point is illustrated in FIGURE 5g, being the result of retro-correlating the primary reflection 65 in FIGURES 5b–5f with the complete seismic trace of FIGURE 5a. As shown in FIGURE 4d, this signal is inverted in the unit 83 before being passed to the display; thus the final output is that of FIGURE 5h. Comparison of this with FIGURE 5a shows that the final output represents all the multiples synthesized with correct amplitudes; the exaggeration of higher-order multiples evident in the simple retro-correlogram of FIGURE 1h has been removed.

Thus the arrangement of FIGURE 4d overcomes the weakness of that of FIGURE 4a, that is the exaggeration of the higher-order multiples. However, it does so only by introducing exacting requirements for the amplitude, form and time of the synthetic anti-multiples, as discussed above in connection with FIGURE 4c.

There are two reasons why these exacting requirements are more tolerable with the arrangement of FIGURE 4d than with that of FIGURE 4c. The first reason is that detailed transgression of these requirements produces results on the retro-correlogram—on the display of synthetic multiples—which are much more easily identified as such by a person skilled in the art than is the case when these synthetic multiples are used to suppress the observed multiples on the record section itself. The deviations from perfect behaviour—caused for example by normal move-out or dip—can be noted by eye, and allowance can be made for them. The second reason is concerned with the desirable feature of reducing the gain in the feedback loop somewhat below that indicated by theory; this has the stabilising effect of decreasing the sensitivity of the system to noise of various types. However, if this amplitude reduction is made in the arrangement of FIGURE 4c, it reduces the degree of suppression of the multiples in the final treated section; if it is made in the arrangement of FIGURE 4d, it merely allows a very slight exaggeration of the higher-order multiples in the final retrocorrelogram.

In all of the four arrangements described in this specification and illustrated in FIGURE 4, advantage may be taken of many techniques of seismic processing already well known in the art. Thus the usual trace corrections may be applied, traces may be added, velocity filtering may be applied, and parts of the input traces which do not contribute usefully may be removed. Further, the input traces and the comparison record section may be subjected to deconvolution for the effects of earth filtering and near-surface reverberation; the latter feature is of particular value when, for one reason or another, the input traces do not include good primary reflections from the near-surface reflectors. It is also intended to include the method of operation in which the seismic trace depicted in FIGURE 5a is obtained an observation separate from that which yields the trace depicted in FIGURES 5b–5f; in particular the former trace may be an alternative version of the seismic reflection signal, obtained for example with a source of less strength or with a different spread arrangement.

The apparatus used for the implementation of the methods described herein may be either digital computer or an analogue correlator.

In the digital case, the input trace may be represented as the time series $f_0, f_1, f_2, \ldots f_i \ldots f_I$, where $f_0$ is always zero and where I, the number of samples to be used, may be several hundreds or thousands. Then if the output trace is corresponding $g_0, g_1, g_2 \ldots g_i \ldots g_I$, the operation to be performed by the computer to represent the arrangement of FIGURE 4c is $$g_i \sum_{j=0}^{i-1} g_j \cdot f_{i-j}$$

In this equation the scaling factor referred to earlier is the value of $g_0$; variations in this may be used for controlling the gain in the feedback loop, as also discussed hereinbefore If the operation is to be done by analogue means, we prefer to use a magnetoresistive correlator as illustrated in FIG. 7.

In FIGURE 7, the correlator includes two endless loops 121 and 122 formed of magnetic tape, which can be made to pass along a magnetoresistive correlating head 123. The tapes are carried by two pairs of rollers 124, 125 and 126, 127, while the drives to the tapes may be imparted through these rollers or by other means.

The lower tape 121 is provided with a brake or clamp (not shown) by means of which its movement can be stopped, but the upper tape 122 normally cycles continuously.

Figure 6:
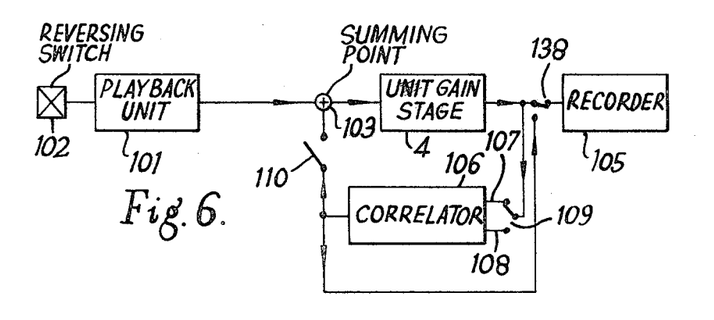
FIGURE 6 shows, in block diagram form, how the arrangements of FIGURE 4 may be implemented by analogue means.

The lower tape 121 is provided with a recording head 128, which is fed with the first component signal entering the retro-correlation apparatus. This is done through an amplifier 129 the input 107 of which is connected to the switch 109 (FIGURE 6). Similarly the second component signal can be recorded on the tape 122 by means of a recording head 130. This head is supplied through an amplifier 131 the input 108 of which is connected to the other contacts of the switch 109. Erase heads 132 and 133 are provided for the tapes 121 and 122.

The output of the correlator 106, which is in the form of a voltage generated between the ends 134 and 135 of the head 123, is fed through a bridge circuit, indicated generally at 136, to an amplifier 137, the output from which is fed through the switch 110 (FIGURE 6) to the summing point 103, or through the switch 138 to the recorder 105, according to which of the arrangements of FIGURE 4 is desired.

The operation of the apparatus will be clear from the following description. With the switch 110 (FIGURE 6) open and the switches 102 and 109 appropriately set, the seismic reflection signal from the unit 101 is fed through the stage 104 and amplifier 129 (FIGURE 7) to the head 128, by which it is recorded on the tape 121. This tape is moved to bring the recording over the magneto-resistive head 123 and is then stopped. The direction of this recording is reversed in time as compared with the direction of travel of the tape 122.

The switches 102 and 109 are now reversed. The playing unit 101 is again operated to feed the seismic reflection signal to the apparatus. This signal is fed through the stage 104 and through the switch 109 to the input 108 of the correlator 106. It is here recorded on the tape 122.

Operation of the correlator then produces a retro-correlated output.

If it is desired to implement FIGURE 4a the switch 110 is left open and the recorder 105 is connected to the output of the correlator by the switch 138. Simple means (not shown) may be provided for changing the polarity of this output.

If it is desired to implement FIGURE 4b, the switch 110 is left open and the recorder 105 is connected to the outputs of both the stage 104 and of the correlator 108 by the switch 138.

If it is desired to implement FIGURE 4c, the switch 110 is closed during the retro-correlation operation and the output from the correlator 106 is thus fed back to the summing point 103, and added to the input signal, as has been described. The recorder 105 is connected to the output of the stage 104 by the switch 138.

If it is desired to implement FIGURE 4d, the switch 110 is closed during the retro-correlation operation and the recorder 105 is connected to the output of the correlator 106 by the switch 138.

In the operations corresponding to FIGURES 4c and 4d, the lower loop 121 of the correlator 106 should stop with the time origin of the corresponding recording aligned with the recording head 130. Time adjustments of the type referred to in the previous description may be made by subsequent adjustment of the position of the head 130. Amplitude adjustments corresponding to variation in the gain of the feedback loop may be made by controlling the gain of the amplifier 137.

We claim:

1. A method of producing and interpreting seismic reflection signals, which method includes the steps of developing received seismic reflection signals by passing seismic waves from one or more sources through the earth to one or more receiving points, each such reflection signal representing the waves arriving at a receiving point from a source and including primary reflections from one or more subsurface interfaces and multiple reflections arriving at the receiving point after reflection from more than one reflecting surface, producing a synthetic multiple-reflection signal by retro-correlating a reflection signal with a reference signal representing at least a portion of one of said reflection signals, producing a first display from one of said reflection signals, producing a second display from at least part of said synthetic multiple-reflection signal, and comparing said first and second displays to facilitate identification of primary reflections on said first display.

2. A method according to claim 1 wherein the signal used in producing one of said first and second displays is inverted prior to producing said one display.

3. A method according to claim 1 wherein the steps of comparing said first and second displays is accomplished by orienting said first and second displays side by side with common time points in alignment.

4. A method according to claim 3 wherein the signal used in producing one of said first and second displays is inverted prior to producing said one display.

5. A method of producing and interpreting seismic reflection signals, which method includes the steps of developing received seismic reflection signals by passing seismic waves from one or more sources through the earth to one or more receiving points, each such reflection signal representing the waves arriving at a receiving point from a source and including primary reflections from one or more subsurface interfaces and multiple reflections arriving at the receiving point after reflection from more than one reflecting surface, producing an output signal by retro correlating a reflection signal with a reference signal representing at least a portion of one of said reflection signals, and adding a signal corresponding to at least a portion of said output signal in out-of-phase relationship with another signal corresponding to at least a portion of one of the reflection signals to develop a resulting signal.

6. A method according to claim 5 which includes the further step of producing a record of said resulting signal.

7. A method of producing and interpreting seismic reflection signals, which method includes the steps of developing received seismic reflection signals by passing seismic waves from one or more sources through the earth to one or more receiving points, each such reflection signal representing the waves arriving at a receiving point from a source and including primary reflections from one or more subsurface interfaces and multiple reflections arriving at the receiving point after reflection from more than one reflecting surface, producing an output signal by retro-correlating a reflection signal with a reference signal representing at least a portion of one of said reflection signals, and supplying said output signal to a display unit to develop a visual display.

8. A method according to claim 7 which includes the further step of inverting the output signal before supplying it to the display unit.

9. A method according to claim 7 which includes the further step of combining the output signal with at least a portion of one of said reflection signals.

10. Apparatus for producing a signal for the intepretation of reflection signals derived by passing seismic waves from one or more sources to one or more receiving points, each reflection signal representing seismic waves arriving at a receiving point from one of the sources and including primary reflections arriving at the latter receiving point after reflection from a subsurface interface and multiple reflections arriving at that receiving point after reflection from more than one reflecting surface, said apparatus including a retro-correlation unit, means for feeding a signal obtained at least in part from a reflection signal into the said unit, means for obtaining from the apparatus an output signal which at least in part represents retro-correlation of the latter reflection signal with a signal corresponding to at least a portion of one of said reflection signals and means utilizing said output signal to develop a visual display record.

11. Apparatus according to claim 10 including a correlator having first and second input connections and an output connection such that a signal produced at the output connection represents a finite cross-correlation function of signals applied to the said input connections, means for applying a signal representing the waveform of at least part of one of the reflection signals reversed in time to a first one of said input connections, a feedback loop having input and output terminals, the feedback path from the said output to said input terminal being formed through the second one of the said input connections to the output connection of said correlator, and means for recording the resulting signal which is produced at the output terminal of said loop.

12. Apparatus according to claim 10 in which the said correlator includes:
   (a) a correlating head of extended length formed of a magnetoresistive material;
   (b) first and second magnetic recording media;

(c) means for recording a signal representing at least part of one of the reflection signals on one of the said media and bringing this recorded medium into position along the said head; and (d) means for causing the second recording medium to travel along the said head.

References Cited

UNITED STATES PATENTS

| | | | |
|---|---|---|---|
| 3,108,249 | 10/1963 | Clement | 340—15.5 |
| 3,182,256 | 5/1965 | Andrew. | |
| 3,273,113 | 9/1966 | Lerwill et al. | |

OTHER REFERENCES

Smith, A Review of Methods of Filtering Seismic Data, Geophysics, vol. 23, No. 1, January 1958, pp. 44–57.

RODNEY D. BENNETT, JR., Primary Examiner

D. C. KAUFMAN, Assistant Examiner

U.S. Cl. X.R.

235—181